Patented July 8, 1952

2,602,767

UNITED STATES PATENT OFFICE 2,602,767

MYCOSUBTILIN AND ITS PRODUCTION

Robert B. Walton, Rahway, and Harold B. Woodruff, Westfield, N. J., assignors to Merck & Co., Inc., Rahway, N. J., a corporation of New Jersey No Drawing. Application April 8, 1949,
Serial No. 86,388

2 Claims. (Cl. 167—65)

This invention relates to the preparation of an antibiotic and, more particularly, to a new crystalline antifungal substance, mycosubtilin, and to a method for the manufacture thereof.

It is well known that several different antibiotics are usually present in cultures of antibiotic-producing strains of aerobic spore-formers and that some of these substances have been identified as polypeptides, such as gramicidin and tyrocidin, which have different biological spectra of antibiotic action. Among the other antibiotics that have been isolated from cultures of B. subtilis, a typical aerobic spore-former, are bacitracin, bacillin, eumycin, bacillomycin and subtilin. Aside from eumycin and bacillomycin, which possess antifungal action, these substances possess only antibacterial action.

It has now been found that a new crystalline antifungal agent, mycosubtilin, can be isolated from a fermented culture of selected strains of B. subtilis. One strain from which mycosubtilin has been prepared, designated as B. subtilis 370, was obtained originally from the Western Regional Research Laboratory of the United States Department of Agriculture.

In accordance with our invention, the aforementioned strain of B. subtilis is propagated in a suitable aqueous nutrient medium for a period of time in excess of 3 days, during which time the medium is agitated and aerated to stimulate the submerged growth. The solid portion of the fermented medium, i. e. bacterial cells and other solids, is separated from the medium by centrifugation and the active agent is isolated, in successive extraction steps, by the use of selective organic solvents. The resulting product is the pure and crystalline fungistatic material.

Although the prior art indicates that subtilin has likewise been prepared by the propagation of B. subtilis 370 in nutrient mediums, fundamental and basic differences exist between this substance and the new antibiotic. This is evidenced by the fact that the propagation of B. subtilis for the production of subtilin requires a period of growth varying from only 18 to 30 hours whereas the optimum time for the production of the mycosubtilin is a time period varying from 3 to 14 days. Another factor that serves to distinguish mycosubtilin from subtilin is that the former does not appear in the liquid portion but only in the insoluble debris in the fermented broth and is removed by centrifugation of this solid portion.

Additional and significant differences between these antibiotics appear in the methods used for their isolation; for example, subtilin is not soluble in 95% alcohol while the instant fungistatic agent is conveniently removed and extracted by the use of alcohol. Then, subtilin does not crystallize from pyridine solution, while this property is used to prepare the fungistatic agent.

A further difference is to be found in the chemical nature of subtilin, which is a sulfur-containing compound, and mycosubtilin, which is lacking in sulfur.

Although cultures of strains of B. subtilis used in the preparation of mycosubtilin have been propagated in various mediums, best activity has been obtained in a molasses salt medium and a semi-synthetic medium containing yeast extract. The temperature for propagation may vary from 24 to 37° C., a temperature of about 25° C. being preferred because of the increased yields that are obtained and the greater ease with which filtration and extraction operations can be conducted. The period of time necessary for growth is likewise an important factor in the preparation of this agent, optimum growth being obtained in a period of time varying from 3 to 14 days.

In the preparation of this material, submerged aerated cultures of the B. subtilis were propagated in an agitated beet molasses medium. Within five days, evidence of fungistatic activity was detected in the medium.

Fermented cultures produced in a semi-synthetic medium containing 0.5% yeast extract, sucrose, citric acid, sodium sulfate, potassium chloride, magnesium chloride, etc., dissolved in water and adjusted to a pH of about 6.8 to 6.9 also produced a broth activity comparable to that obtained in cultures prepared with beet molasses medium. However, a true assay could not be acquired from the raw broth, probably because of insolubility of the antibiotic and its tenacious retention by the cells. The broth samples were usually mixed with three volumes of ethanol to aid extraction of the antibiotic and to sterilize the culture for assay.

The active agent is not present in the liquid portion of the fermented material but is found in the fermentation debris, being removed therefrom by centrifugation. The medium is treated with an acid such as hydrochloric, sulfuric, acetic, etc., to adjust the pH to about 2.5 in order to precipitate cellular material and thereby facilitate the centrifugation step. The solid portion is extracted either by repeated treatments with a water-miscible lower aliphatic alcohol, methanol and ethanol being preferred, or by the use of pyridine.

The active material is obtained in amorphous form by precipitating from the ethanol concentrate with water. Another method which may be used includes evaporation of the alcoholic solution to dryness. The solids are then extracted repeatedly with warm 95% ethanol, mycosubtilin being contained in the extracts in purified form. Any traces of subtilin which may have been present in the first concentrate are removed at this stage because of insolubility in 95% ethanol. Mycosubtilin is then crystallized by cooling the ethanol solution. In the case of the pyridine extract, the fractional precipitation with water is followed by crystallization. The product is the new preparation of an antifungal agent in a highly purified and crystalline form.

The white crystals obtained are practically insoluble in organic solvents with the exception of pyridine and aqueous ethanol solutions containing at least 70% ethanol, being very soluble in the former and only slightly soluble in the 70% ethanol. The antifungal agent crystallizes readily from the latter upon cooling. The crystals are soluble in dilute cold sodium hydroxide but insoluble in dilute cold hydrochloric acid and cold sodium bicarbonate. The crystals are insoluble in n-butanol and acetone, and in this respect differ from eumycin or bacillomycin, both of which are very soluble in these reagents.

2,4-dinitrophenylhydrazine failed to give a precipitate with mycosubtilin. Millon's reagent produced a temporary pink coloration and nitration with concentrated $HNO_3$ formed a pale yellow pigment. Acid-hydrolyzed crystals gave a positive ninhydrin test and the presence of amino acids was shown in the hydrolyzate by paper chromatographs and by microbiological assay.

The crystals had a melting point of about 256–257° C. (dec.) and the following results were obtained on analysis: N=15.15, 15.18%, C=55.31, 55.12% and H=7.61, 7.33%. Sulfur was not present.

The ultra-violet absorption spectrum of an alcohol-water solution consisted of a band at 2770 Å. with an $$E_{1\,cm.}^{1\%} = 14.58$$

Potentiometric titration showed an apparent combining weight by alkali titration of 1980. General insolubility made the compound unsuitable for molecular weight determination.

The absorption spectrum of a sample of mycosubtilin was determined, employing a Baird double beam infra red spectro-photometer, using a sodium chloride prism and a sodium chloride reference cell, and using standard slit schedules and standard scanning speed. The resolution of the spectrophotometer was about 10 wave numbers in the 7–8 microm wavelength region. The solid sample was mulled in Nujol (heavy petrolatum) for the determination. The entire system was at a constant temperature of about 23° C. The absorption curve in the characterizing region of 7.5 to 13 microns wavelength showed a great deal of general absorption and no strong absorption maxima. Principal maxima and relative intensities in this region follow:

| Absorption Maxima in Microns | Relative Intensity |
|---|---|
| 7.53 [1] | M (broad band). |
| 7.85 | W. |
| 7.98 | M. |
| 8.12 | W (shoulder). |
| 8.32 | M |
| 8.43 [1] | M (shoulder). |
| 8.87 [1] | M (very broad band). |
| 9.33 | M. |
| 9.59 | M. |
| 10.00 | W. |
| 10.37 | W. |
| 10.79 | W. |
| 11.03 | M. |
| 12.10 | M. |
| 12.50 | W. |
| 12.86 | W. |

S=strong absorption  M=moderate  W=weak.
[1] Reading at center.

Since it is well established that the infra-red absorption spectrum of a solid sample is a function of its physical state, as well as its molecular structure, it is to be understood that the foregoing data represents the spectrum of the physical form of crystalline mycosubtilin isolated in accordance with the process herein described.

The substance is heat-stable, resisting autoclaving in agar 15 minutes at 120° C. and 15 lbs. pressure.

A concentration of 0.0015 mg./ml. in agar inhibited the growth of the test organism *Trichophyton sp.* by the streak plate method on yeast dextrose agar. However, the addition of 10% horse serum incorporated in the agar completely neutralized the activity.

*Micrococcus lysodeikticus* was inhibited by 0.001 mg./ml. of nutrient agar by the streak plate method but 0.016 mg./ml. failed to inhibit *Staphylococcus aureus, Streptococcus pyogenes, S. viridans, Escherichia coli, Eberthella typhosa, Klebsiella pneumoniae, Hemophilus pertussis, Corynebacterium diphtheriae, Pseudomonas aeruginosa, Mycobacterium tuberculosis, Salmonella aertrycke, S. paratyphi A, S. schottmuelleri, Alcaligenes faecalis,* and *Bacillus magatherium.*

The yeast spectrum, Table I, and the fungus spectrum, Table II, were determined by streaking the test organisms on yeast extract dextrose agar. The results indicate the smallest amount of mycosubtilin required to cause complete inhibition.

TABLE I

*Fungistatic activity of mycosubtilin on Yeasts*

Complete inhibition mgm./ml.
Candida guilliermondia, 488 ____ N. A. at 0.02
Debaromyces gruetzii, 4144 ____ N. A. at 0.02
Dipodascus uninucleatus _____ 0.00375
Hansenula anomola, 4104 _____ 0.00375
Mycoderma valida _____ 0.0075
Rhodotorula rubra _____ Ca 0.005
Saccharomyces carlbergensis, 9080 _____ 0.0075
Schwanniomyces occidentalis __ N. A. at 0.02
Sporobolomyces roseus _____ 0.005
Torula cremoris _____ 0.005
Torulopsis delbruckii _____ 0.00375
Zygopickia californica _____ N. A. at 0.02

TABLE II

*Fungistatic activity of mycosubtilin on molds*

| | Complete inhibition mgm./ml. |
|---|---|
| Aspergillus niger | N. A. at 0.02 |
| Chaetomium bostrychodes | 0.005 |
| Fusarium moniliforme | 0.0075 |
| Nematospora coryli | 0.0075 |
| Trichoderma sp. | N. A. at 0.02 |
| Trichophyton sp. | 0.0015 |
| Mucor flavus | N. A. at 0.02 |
| Penicillium notatum | 0.0075 |
| Rhizopus javanicus Takeda | N. A. at 0.02 |
| Sclerotinia fructicola | 0.0025 |
| Ustalago zea | 0.0015 |
| Microsporum audouini | 0.005 |
| Achorion schoenleini | 0.005 |
| Microsporum lanosum | 0.01 |
| Trichophyton mentagrophytes | 0.01 |
| Crytococcus neoformans | 0.005 |
| Epidermophyton inguinale | 0.005 |

(N. A. indicating no inhibition)

Toxicity was determined by subcutaneous injection of the antifungal agent into white Swiss mice weighing approximately 20 grams each. For injection into mice, a solution containing 2 mg. of agent per ml. was prepared by mixing an alcoholic solution of the crystalline material with 20% aqueous gelatin. Deaths were observed following single doses of one or 0.5 mg., but single doses of 0.25 mg. or less were tolerated.

It was impossible to demonstrate the agent in the blood of injected animals because of the neutralizing effect of blood serum on the antifungal activity.

The following example illustrates a method of carrying out the present invention, but it is to be understood that this example is given by way of illustration, and not of limitation.

EXAMPLE

Submerged aerated cultures of a strain of *B. subtilis* obtained from the Western Regional Research Laboratory of the United States Department of Agriculture (Jansen, Hirschmann, 1944) were grown in 250 ml. flasks containing 50 ml. of 20% beet molasses with 0.8% $(NH_4)_2HPO_4$ and 0.005% $MnSO_4.4H_2O$, on a shaker rotating at 220 R. P. M. The cultures were maintained at a temperature of 25° C. Under these conditions, fungistatic activity was produced in 5 days.

The broth was adjusted to about a pH of 2.5 with concentrated hydrochloric acid in order to precipitate the cellular material and then said cellular material was separated by centrifugation. The first extraction of the moist cell solids was made overnight using a 95% ethanol solution. Subsequent extractions of the cells were made overnight using 70% ethanol solutions. The solids were separated from the ethanol suspensions by filtration. The active fraction was precipitated quantitatively by the addition of 2 volumes of water followed by centrifugation. The solids were successfully extracted with a 95% ethanol solution, material of increased purity being obtained with each successive extract. The ethanol was evaporated to dryness and all of the remaining solids were dissolved in a very small quantity of pyridine. White crystalline material was separated during a period of several hours at 10° C., following the addition of 10 volumes of water. The crystals were washed with water and recrystallized from 70% ethanol.

It was found also that the solids from the 70% ethanol extract of the cells could be directly dissolved in the pyridine, thus eliminating the 95% ethyl alcohol extract operation and obtaining, thereby, improved yields. Several recrystallizations were necessary to obtain the pure material. The following table represents a typical extraction from a culture produced in beet molasses which had a moist cell volume of 15%.

TABLE I

*Isolation data for antifungal agent*

| | Volume ml. | Solids dry wt. mgm./ml. | Activity dilution units/mgm. | Total Activity |
|---|---|---|---|---|
| Original whole broth | 1,080 | 79.3 | 1.9 | 162,000 |
| Cell extraction: | | | | |
| First (95% EtOH) | 103 | 36.4 | 19.2 | 72,000 |
| Second (70% EtOH) | 96 | 21.5 | 46.5 | 96,000 |
| Third (70% EtOH) | 100 | 12.9 | 54.3 | 70,000 |
| Extraction of solids: | | | | |
| First (95% EtOH) | 17 | 28.6 | 35.0 | 17,000 |
| Second (95% EtOH) | 19 | 9.9 | 101. | 19,000 |
| Third (95% EtOH) | 19 | 2.4 | 208. | 9,500 |
| Fourth (95% EtOH) | 15 | 1.0 | 400. | 6,000 |
| Fifth (95% EtOH) | 19 | 0.6 | 416. | 4,750 |
| Crystallization from pyridine. | | 88.9 (Total) | 700. | 62,000 |

Various changes and modifications may be made in carrying out the present invention without departing from the spirit and scope thereof. Insofar as these changes and modifications are within the scope of the appended claims, they are to be considered as part of this invention.

We claim:

1. A crystalline, thermostable, antifungal agent, herein termed mycosubtilin; containing the elements carbon, hydrogen, and nitrogen and further characterized by the absence of the element sulfur; having a typical elemental analysis of N=15.15–15.18%, C=55.12–55.31% and H=7.33–7.61%; being insoluble in water, n-butanol, acetone, and cold dilute hydrochloric acid and soluble in pyridine, methanol, ethanol, and dilute cold sodium hydroxide, having a melting point of about 256–257° C. with decomposition; having a characteristic ultra-violet spectrum with an intense band at 2770 Å., $$E_{1\,cm.}^{1\%} = 14.58$$

exhibiting a characteristic infra-red absorption spectrum when suspended in solid form in heavy petrolatum having the following principal maxima and relative intensities

| Absorption Maxima In Microns | Relative Intensity |
|---|---|
| 7.53 [1] | Moderate (broad band). |
| 7.85 | Weak. |
| 7.98 | Moderate. |
| 8.12 | Weak (shoulder). |
| 8.32 | Moderate. |
| 8.43 [1] | Moderate (shoulder). |
| 8.87 [1] | Moderate (very broad band). |
| 9.33 | Moderate. |
| 9.59 | Do. |
| 10.00 | Weak. |
| 10.37 | Do. |
| 10.79 | Do. |
| 11.03 | Moderate. |
| 12.10 | Do. |
| 12.50 | Weak. |
| 12.86 | Do. |

[1] Reading at center.

and also characterized as being strongly active fungistatically, and inactive bacteriostatically against *S. aureus*, *S. pyogenes*, *E. coli*, *Mycobacterium tuberculosis*, and *Cor. diphtheriae*.

2. The process for preparing mycosubtilin which comprises propagating *B. subtilis* 370 in a nutrient medium under submerged conditions with agitation and aeration at a temperature within the range of 24–37° C., acidifying the resulting broth, separating the solid portion of said broth, extracting said solid portion with ethanol, recovering impure mycosubtilin from the resulting alcohol extracts, dissolving said impure mycosubtilin in pyridine, and recovering crystalline mycosubtilin from said pyridine solution.

ROBERT B. WALTON.
HAROLD B. WOODRUFF.

REFERENCES CITED

The following references are of record in the file of this patent:

Dimick et al., Arch. Biochem., 15, 1 (1947), pp. 1 to 11.

Jansen et al., Arch. Biochem., 4, 3, pp. 297 to 309 (1944) July.

Garibaldi, I. and E. Chem., 41, February 1949, pp. 432–435.

Michener et al., Arch. Biochem., 22, June 1949 (received January 4, 1949), pp. 208–214.

Landy on Bacillomycin in Proc. Soc. Exptl. Biol. and Med. 67, April 1948, pp. 539–541.

Burdon and Johnson, "Progress Report on Eumycin: Preparation of an Improved Product from Synthetic Medium," paper presented at conference on Antibiotic Research, Washington, D. C., January 31–February 1, 1947, pages 1 and 2.